No. 674,666. Patented May 21, 1901.
J. C. BLEVNEY.
MOTOR DRIVEN VEHICLE.
(Application filed Jan. 14, 1899.)

(No Model.) 6 Sheets—Sheet 1.

Fig. 1.

WITNESSES: INVENTOR:
A. R. Krausse. John C. Blevney,
Russell M. Everett. BY Drake & Co.
ATTORNEYS

THE NORRIS PETERS CO., PHOTO-LITHO., WASHINGTON, D. C.

No. 674,666. Patented May 21, 1901.
J. C. BLEVNEY.
MOTOR DRIVEN VEHICLE.
(Application filed Jan. 14, 1899.)
(No Model.) 6 Sheets—Sheet 4.

WITNESSES: INVENTOR:
A. R. Krouse John C. Blevney,
Russell M. Everett BY Drake & Co.
ATTORNEYS

No. 674,666. Patented May 21, 1901.
J. C. BLEVNEY.
MOTOR DRIVEN VEHICLE.
(Application filed Jan. 14, 1899.)
(No Model.) 6 Sheets—Sheet 5.

WITNESSES: INVENTOR:
A. R. Krause John C. Blevney,
Russell M. Everett BY Draper G.
ATTORNEYS No. 674,666. Patented May 21, 1901.
J. C. BLEVNEY.
MOTOR DRIVEN VEHICLE.
(Application filed Jan. 14, 1899.)
(No Model.) 6 Sheets—Sheet 6.

WITNESSES: INVENTOR:
John C. Blevney,
BY
ATTORNEYS

UNITED STATES PATENT OFFICE.

JOHN C. BLEVNEY, OF NEWARK, NEW JERSEY.

MOTOR-DRIVEN VEHICLE.

SPECIFICATION forming part of Letters Patent No. 674,666, dated May 21, 1901.

Application filed January 14, 1899. Serial No. 702,119. (No model.)

*To all whom it may concern:*

Be it known that I, JOHN C. BLEVNEY, a citizen of the United States, residing at Newark, in the county of Essex and State of New Jersey, have invented certain new and useful Improvements in Motor-Driven Vehicles and Means for Regulating the Movements Thereof; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The objects of this invention are to enable the motorman or driver of the vehicle to more perfectly control the movements of the latter; to facilitate the work of reversing the direction of movement of the vehicle or increasing or diminishing the speed of the same; to secure a simple construction and one requiring less power on the part of the motorman to secure a change of movement; to secure a more direct transmission of power from the piston of the motor to the wheels of the vehicle; to secure a greater variety of adjustments by which various changes of speed are accomplished; to secure a more positive transmission of power from the motor stationed upon the springs of the vehicle to the axle and wheels of the vehicle; to more uniformly and exactly take up the looseness in the chain or other connections, due to the action of the body of the vehicle and motor on the supporting-springs; to secure a construction occupying a smaller amount of space within the vehicle, and to secure other advantages and results, some of which may be referred to hereinafter in connection with the description of the working parts.

The invention consists in the improved power-transmitting and speed-regulating means for motor-driven vehicles and in the arrangements and combinations of parts of the same, all substantially as will be hereinafter set forth, and finally embraced in the clauses of the claim.

Referring to the accompanying drawings, in which like characters of reference indicate corresponding parts in each of the several views.

In said drawings, $a$ indicates the floor or body of a wheeled vehicle of any suitable construction. This vehicle-body is ordinarily arranged upon springs attached to the axle of the wheels upon which the vehicle travels, the said springs $a'$ permitting a limited freedom of vibration of the vehicle-body independent of the movement of the axle, as will be understood. Upon the said floor or body $a$ is bolted or otherwise secured a bed plate or frame $b$, adapted to move with the body $a$ on the said springs, and upon said bed plate or frame $b$ are arranged the several working parts, the said bed plate or frame being provided with suitable studs or supports to receive said working parts. Upon said bed-plate are cast or otherwise formed the motor-cylinders $c\ c$, in which are operated pistons, (not shown,) by means substantially as heretofore described by me in my prior application filed December 29, 1896, Serial No. 617,372. Said pistons are connected by means of suitable rods (not shown) to arms $d$ of an oscillating shaft $e$, said shaft being arranged in bearings or boxes $f$, attached to the bed-plate $b$, contiguous to said cylinders. At one end of the said oscillating shaft is arranged or formed a slideway $g$ at right angles to the axis of said shaft, and in said slideway is arranged a slide $h$, provided near its upper end with a pin $i$, which projects in a line parallel with the axis of the oscillating shaft and is adapted to receive the connecting-rod *j*. Above said pin *i* and at the lower extremity of the said slide *h* are suitable connections *k k* for a chain *l* or other flexible connection adapted to cause said slide to move longitudinally in its slideway. Said chain also operates a brake device, as hereinafter described. To operate said slide longitudinally in connection with the chain, I employ a sprocket-wheel *m*, Figs. 1, 2, and 3, arranged on a hand-shaft *n*, in connection with a hand-wheel *o*, said hand-wheel being turned with the sprocket-wheel in either direction to cause a raising or lowering of the slide *h* in its slideway *g*, the said chain being arranged over idle pulleys *p p*, Figs. 1 and 6, in suitable bearings *q*, Fig. 6, formed on the slideway as near to the axis of the oscillating shaft as convenience will permit. Other idle pulleys *p'* may be employed to change the direction of the chain or connection, as convenience or the style or character of the vehicle may require. In lieu of the hand-wheel *o* I may employ a simple hand-crank or other device convenient to be grasped by the hand and secure an operation of the sprocket-wheel *m* and chain. By this construction it will be evident that by turning the hand-wheel *o* in one direction the slide *h* will be raised in its slideway and the pin *i* will be thrown upward away from the axis of the oscillating shaft *e*, so that the reciprocations of the pin will be increased in distance of movement, the greater the distance of said pin from said center of movement of the oscillating shaft the greater being the distance of oscillating movement of said pin *i* with the slide *h*, as will be evident.

While I prefer to operate the chain or flexible connection *l* by means of a sprocket-wheel, it is evident that I may produce a draft upon the same by other means. For example, I can dispense with the sprocket-wheel *m* and apply a handle directly to the chain, and thus effect a movement of the slide.

Figures 6, 9:
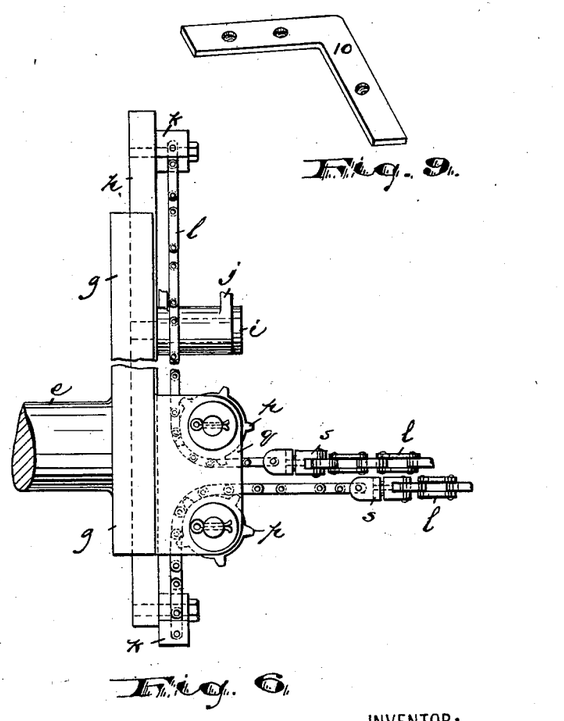
Fig. 6 is a side view of the same.
Figs. 8 and 9 are detail perspective views of means for attaching certain connecting rods or bars to a belt or flexible strap.
Figure 7:
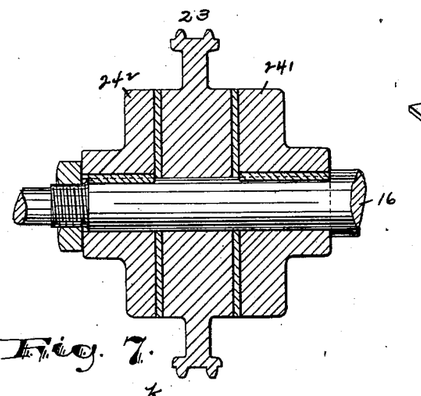
Fig. 7 is a sectional detail of a certain friction sprocket-wheel arranged upon a power-shaft of the device.
Figure 8:
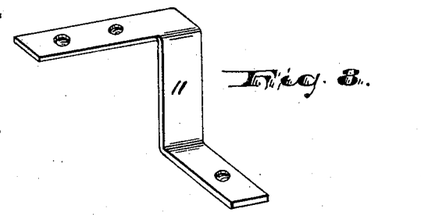
Figure 20:
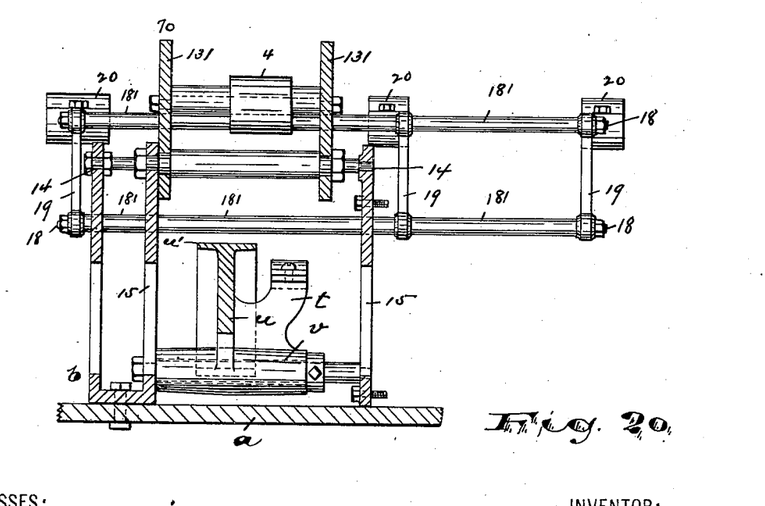
Fig. 20 is a section of the same on line $z$.

To secure an easy movement and reduce the friction on the chain, I have arranged in the chain, near the sprocket-wheels *p p*, swivel-joints *s*, Fig. 6, whereby the chain is adapted to accommodate itself to the various changes in direction due to the rocking of the bar or slide *h* with the oscillating shaft, as will be hereinafter described. Should I employ a rope or leather connection, these swivel-joints will become unnecessary; but I prefer a metal chain, as there will be less chance for stretching. By reversing the hand-shaft *o* the chain will force the slide *h* in the oscillating slideway downward, and the pin *i* will be brought close to the center of movement of said oscillating shaft, and when the said pin arrives at the axial center of said shaft *e* it is evident that said pin will have no reciprocating action, but will simply move with the oscillating shaft in said center and effect no operation of the connecting-rod *j*, now to be described. The said connecting-rod *j* is pivoted upon the pin *i* and extends forward therefrom and is pivotally connected to an eccentric crank-arm *t*, formed upon a sector *u* and pivoted at *v*. Said sector is provided with segments *u' u'*, to which are secured the opposite ends of a strap 3. The arms *t* extend laterally a little beyond the plane of the segments *u' u'*, as indicated in Fig. 20, and thus the connecting-rod *j* will not interfere with the movements of the strap, as will be evident upon reference to Fig. 1. As the connecting-rod *j* is reciprocated by means of the slide of the rocking arm or bar, the sector is also given an oscillating or reciprocating movement, and this movement is transmitted to the belt or band 3. The said band is arranged over idle pulleys 4 4, and at the upper part of said band or belt 3 the same is formed into a loop or what approximates a loop, as indicated in Fig. 2 at 5. To form said loop, the said band is turned over a third idle pulley 6, arranged in bearings on an arm 7 of the pivotal beam or frame 13, the said pulley 6 being adjustable by means of an adjusting-screw 8 in any suitable manner. The portions 81 81, Fig. 2, of the belt, forming the upper and lower sides of the loop, move in opposite directions when the belt is operated by the sector *u*, and to the said parts 81 81 are connected the connecting-rods 9 9 by means of suitably-formed pieces 10 11. (Shown in detail in Figs. 8 and 9.) The said connecting-rods 9 9 lie side by side a little way apart and on each side of the strap—three inches, more or less—and are given longitudinal reciprocations by the belt or band 3, as described, and at their forward ends, opposite those by which they are attached to the belt, are provided with connections 12, by means of which they are attached to independent clutches, such as I will later proceed to describe, said rods 9 and connections being operated alternately to effect an alternating clutching action of the two clutches. By means of the flexible strap 3 power is transmitted without producing noise or vibration, such as more positive metallic connections would produce.

The strap 3, with its idle pulleys 4 4 6 and the clutch mechanisms hereinafter described, is in the preferred construction arranged upon the pivotal frame 13, of which the arm 7 is a part, the said frame 13 being pivoted at 14 upon studs or supports 15, attached to or forming a part of the bed-plate *a*.

Figures 10, 11, 12, 13, 14, 15:
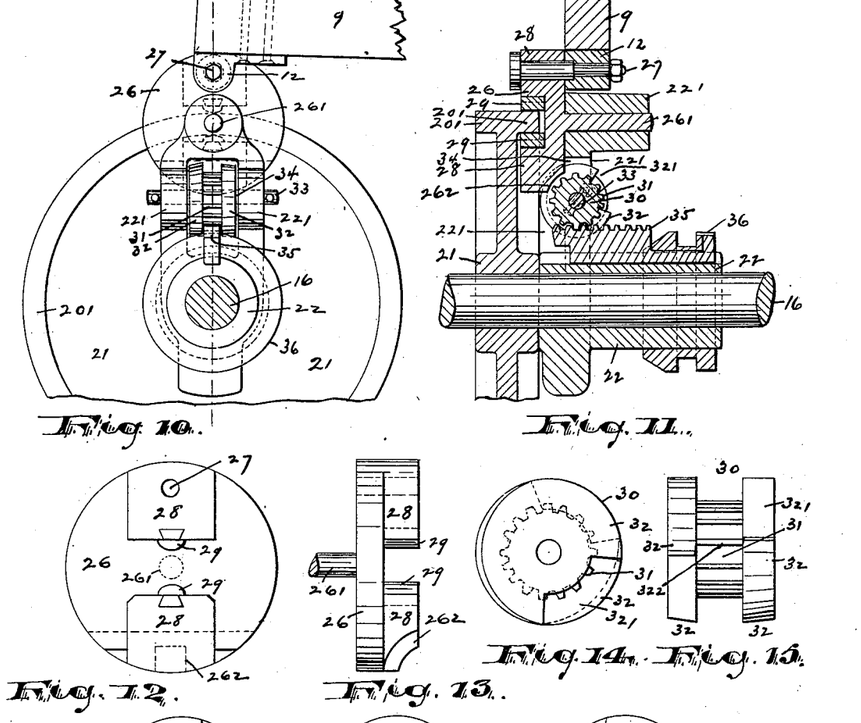
Fig. 10 is a side view of a certain clutch and connections.
Fig. 11 is a section of the same, taken at line $x$.
Figs. 12, 13, 14, 15, 16, 17, and 18 are detailed views of portions of said clutch, which will be hereinafter more fully described.
Figure 16:
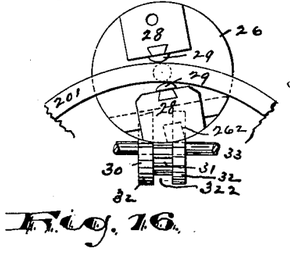

By means of the pivotal frame 13 the power-shaft 16 and the clutching mechanisms connecting therewith are permitted to move independent of the bed-plate *a*, the movements being controlled or governed by the stay 161. The power-shaft-carrying end of said frame is held by said stay 161 at a given distance from the axle, the axle and power-shaft being pivotally connected to said stay. A spring 17 counterbalances the weight of the power-shaft and its connections, relieving the axle of the weight thereof. The said frame which carries the power-shaft consists of two vertical plates 131 131, of irregular shape in side elevation, the said plates at their ends opposite those having the arms 7 being provided with transverse horizontal rods or bolts 18, having collars 181, by means of which the said plates are held apart and in proper vertical position relative to one another. The said bolts extend laterally beyond the planes of the said plates 131, where they are provided with supports 19 19 for boxes 20, in which last the said power-shaft 16 has its bearings. Upon the said power-shaft 16, between the plates 131 131, is arranged a clutch-wheel 21 and at opposite sides of said clutch-wheel loose sleeve 22 for operating the clutch mechanism, the said collars being shown in detail in Figs. 10 and 11. Also on said power-shaft 16 is arranged a sprocket-wheel 23, which is arranged between friction-disks 241 242, the said sprocket-wheel 23 being loose upon said power-shaft and adapted to be clutched thereto by means of the said friction-disks, as will be hereinafter more fully described. By means of the loose sprocket-wheel or pulley and friction-disks the pulley will be allowed to slip under extreme stress, such as might be produced in the event of the vehicle striking a telegraph-pole or the like obstacle, and thus damage by breakage may be avoided. This device also permits a sudden reversal of the movement of the vehicle. The power is transmitted to the wheel 250 of the vehicle from the said sprocket-wheel 23 by means of a chain 25 and sprocket-wheel 251 or in any suitable manner.

To operate the clutch-wheel fastened upon the power-shaft 16 continuously by means of the reciprocating shaft and connections with the clutches by means that are simple and compact, I have provided in connection with the connecting-rods 9 9 clutch devices, (shown more clearly in Figs. 10 to 18,) in which 26 is the clutch-dog, pivoted loosely upon the connecting-rod 9 by means of the pivotal bolt 27, the said dog being provided at one side with bosses 28 28, between which the flanges 201 of the clutch-wheel 21 are arranged, the said clutch-dogs 261 being provided, preferably, with steel contact-teeth 29 to secure a more positive holding contact with the clutch-wheel. The clutching-dogs 26 are pivoted upon arms or extensions 221 of the sleeve 22, the said arms 221 being provided with suitable perforations to receive the pins 261. The said clutching-dogs are limited in their pivotal movements on the pivots 261 by wheel-like stops 30 of peculiar construction, the said stops being pivoted upon pins 33 on the arms 221 of the sleeves, the said wheel-like stops lying within openings 34 of said arms and being adjustable in their relation to the clutching-dogs, whereby the said clutching-dogs are enabled to secure reverse movements, as will be hereinafter described. The said stops each comprise a cog-wheel or pinion 31, at the opposite sides of which are formed flanges 32 32, Figs. 8 to 16, the said flanges being notched at points 321, Fig. 14, in their peripheries to permit a limited lateral movement of a tooth or finger 262 of the clutch-dog 26, the said notches, however, not being opposite or in correspondence or both in a line parallel with the axis of the said stop 30, but being at different points with respect to the periphery of the said stop.

To secure the desired reverse movement, I have provided sliding racks 35, suitably arranged in slideways formed in the sleeves 22 in lines parallel with the axes of said sleeves 22, the said racks being operated in said slideways by means of shifting-collars 36.

Figure 17:
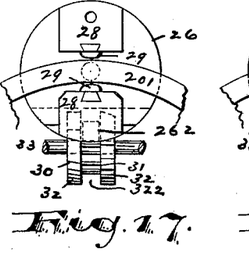
Figure 18:
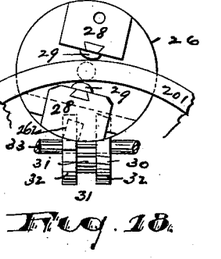
Figure 19:
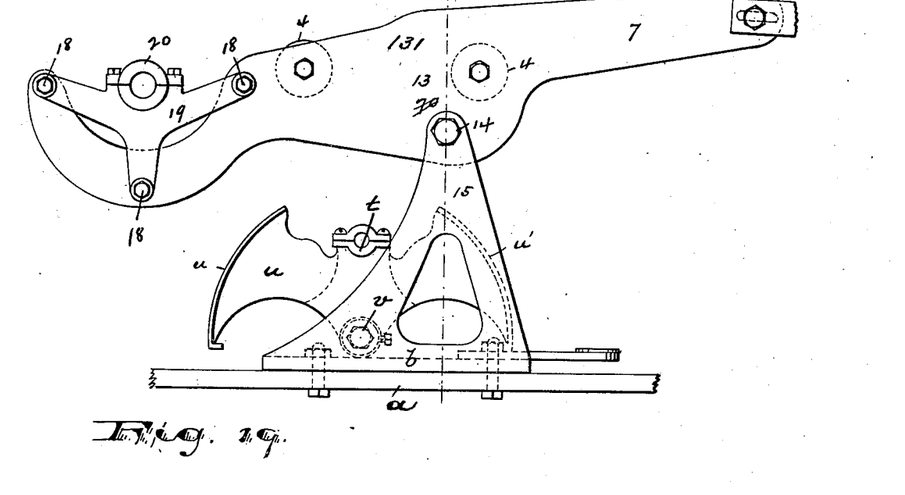
Fig. 19 is a side view in detail of a certain rocker and coöperating parts.

When I desire to secure a change in the movement of the vehicle, I operate the shifting-collar and rack to cause a partial rotation of the pivotal stop upon its axis, whereby the notch 321 lying in coincidence with the tooth 262 will be thrown out of such coincidence and the second notch in the opposite flange will be brought into such coincidence. This will cause a change in the limits of movement of the dog 26, and whereas before the oscillations and reciprocating actions of the said dog in connection with the connecting-rod 9 caused a movement of the clutch-wheel in one direction from the center position the said movement will now be changed to move oppositely from said central position and produce a reverse action. This will be more perfectly understood upon reference to Figs. 16, 17, and 18. In Fig. 17 the tooth 262 lies in the groove 322, out of coincidence with either of the notches 321 of the flanges 32, and thus the clutch-dogs are prevented from biting the flange of the clutch-wheel, and the connecting-rods 9 and dogs, in making their reciprocations, will be ineffective in producing rotary motion of said clutch-wheel. By operating the rack and rotating the stop in one direction from the said central position last described the clutching-dog will be free to give a limited oscillation from said central position in one direction only, the stop 262 being permitted to pass back and forth into and from the notch 321 with which it is in coincidence. The parts are so related that this movement of the clutching-dog causes the clutch to bite the flanges of the clutch-wheel as it moves in one direction—the forward direction, for example—thus causing a step-by-step rotation of the clutch-dog in such direction. By moving the rack in the opposite direction from the center the notch in the opposite flange will be brought into coincidence, as indicated in Fig. 18, in which case the pivoted stop will be permitted to oscillate from its center of movement into the second notch 321, which will cause a biting by the dog only upon the return movement of said dog in its reciprocating action with the connecting-rods 9. This will produce a movement of the clutch-wheel in the reverse direction. The shifting stop-collars 36 36 are operated simultaneously by suitable shifting means, so that the dogs which work alternately are shifted simultaneously to operate in opposite directions, one dog operating the wheel while the other is making its return movement, so that the said dogs will one after the other bite the clutch-wheel and thus effect a continuous movement of said clutch-wheel in the desired direction. The momentum of the carriage serves to effect a regular and smooth movement, so that the step-by-step actions are not perceptible to the rider to any greater extent than the step-by-step movement of a horse.

Figure 1:
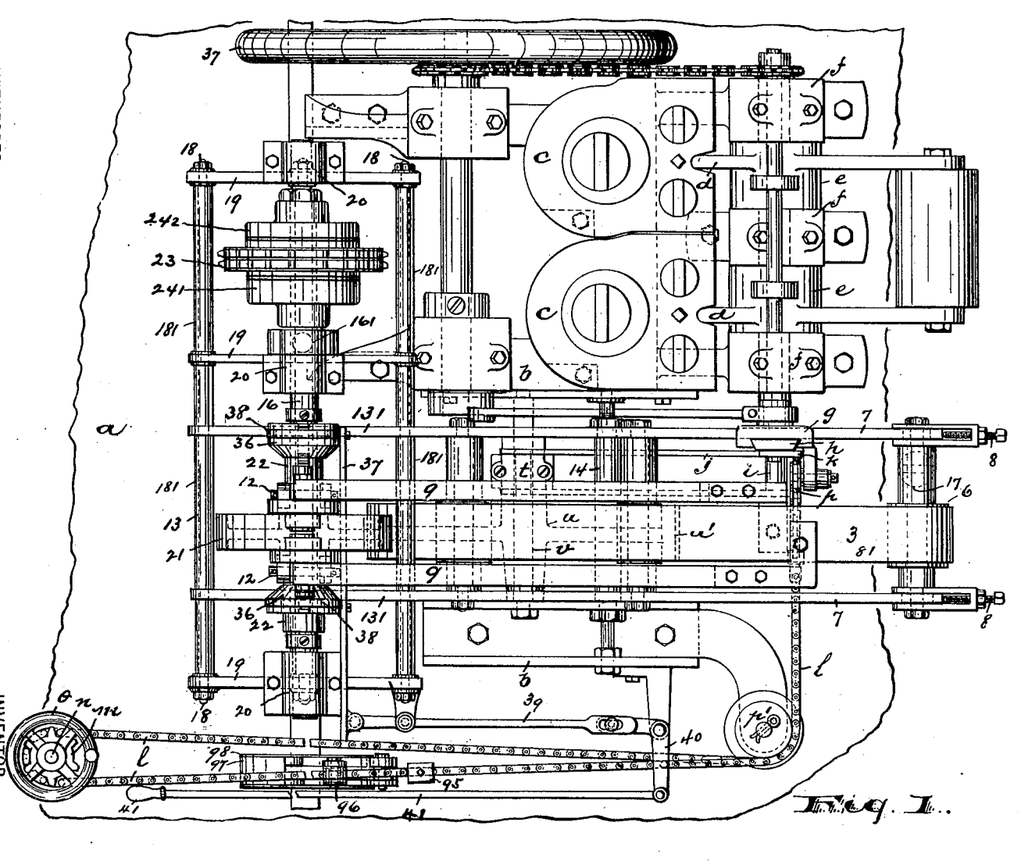
Figure 1 is a plan of the motor and transmitting and governing means embodying my invention.
Figure 2:
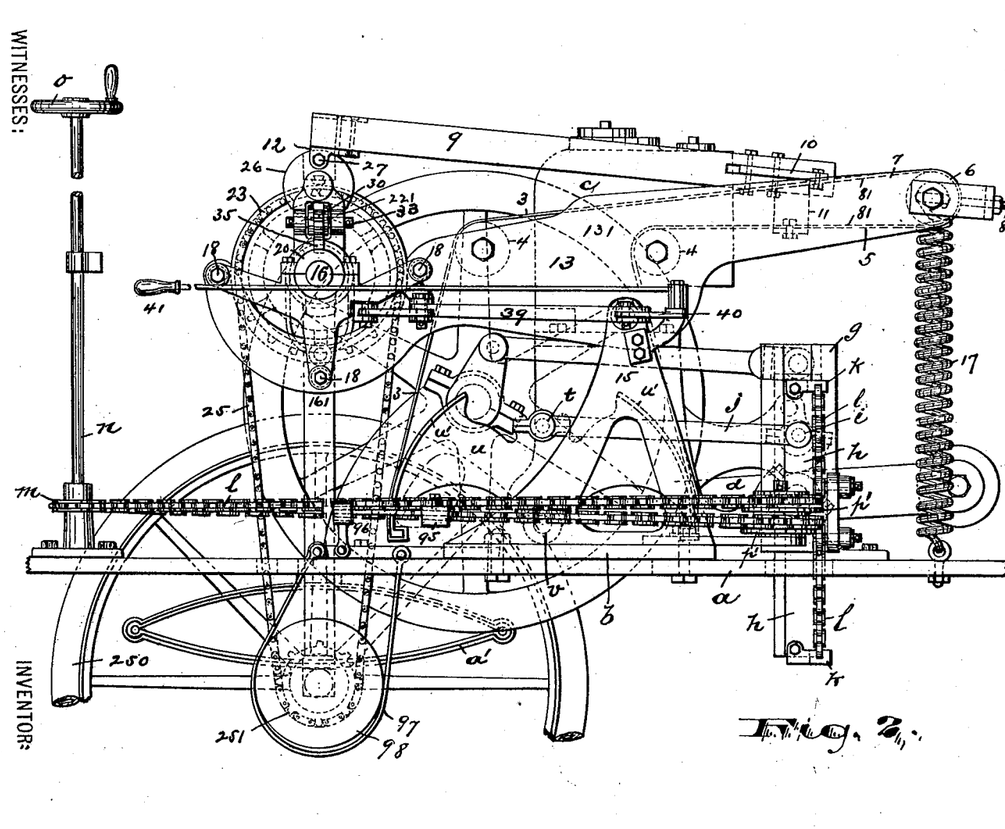
Fig. 2 is a side elevation of the same.

The shifting devices for the collars 36 are shown in Fig. 1. The shifting-sleeves are operated simultaneously, as before described, in the preferred construction, by means of a connecting-rod 37, connecting rings 38, arranged in the groove of the shifting-collar, which connecting-rod 37 is operated, preferably, by levers 39 and 40 and handle 41 in any suitable manner.

To brake the movements of the vehicle, I employ brake devices, which are preferably in connection with the chain $l$, which latter is provided with a collar or equivalent device 95, adapted to engage the arm of a lever 96, the last being adapted to tighten the strap 97 and produce a frictional engagement of the same with a brake-wheel 98 on the axle of the vehicle. The arrangement of strap 97 and lever 96 may be such as is commonly employed in braking operations. When the chain is brought to position to produce an axial coincidence of the pin $i$ and oscillating shaft $e$ and the motor is thus rendered inoperative, the collar on said chain will be in position to produce the braking action, as will be understood.

I am aware that various modifications and changes may be made in the construction of the devices without departing from the spirit or scope of the invention, and I do not wish to be understood as limiting myself to the positive terms employed in describing the invention illustrated.

Figures 3, 4:
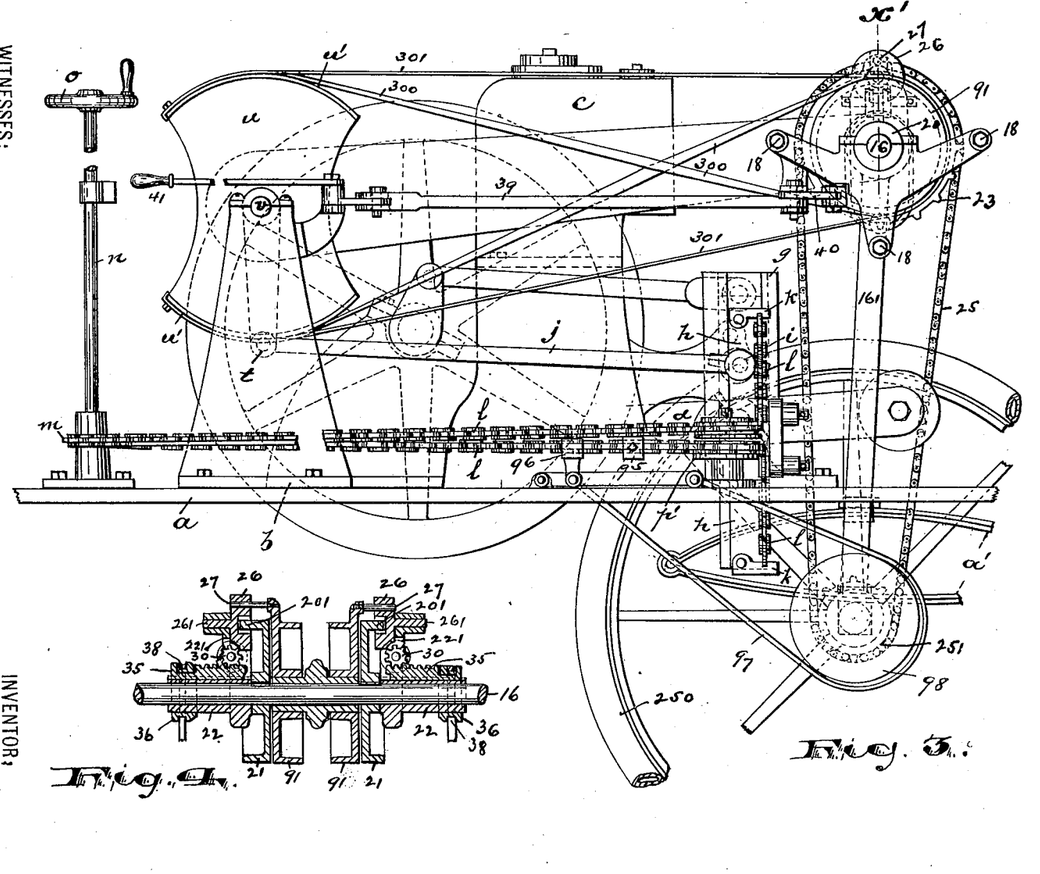
Fig. 3 is a side view showing a modification of construction.
Fig. 4 is a section on line $x'$.
Figure 5:
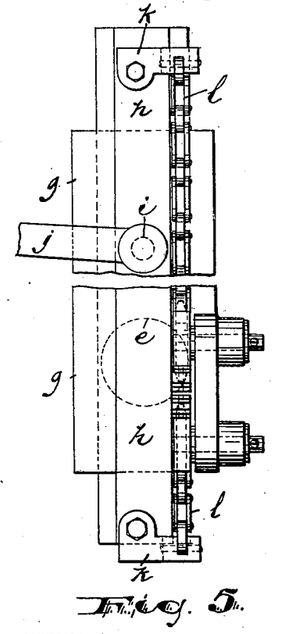
Fig. 5 is an end elevation in detail of a certain regulating-arm and connections for regulating the speed of the vehicle.

As an example of the changes which may be made I have shown the varied construction of Figs. 3 and 4, in which I dispense with the use of a counterbalancing-weight and employ modified means for producing the step-by-step movements of the clutch-wheel. In this modification the sector $u$ is of a different form. It is operated by the connecting-rod $j$, as in the construction first described; but the connections are varied in location. From this sector I employ two straps or bands 300 301, which are passed over and fastened to dog-operating pulleys 91, one of said bands or straps being a cross-strap and connecting with one dog-operating pulley 91 and the "open" band or strap connecting with the other dog-operating pulley 91. This construction and method of securing alternating movements of the clutch-dogs under many conditions is preferred, in that I dispense with the use of connecting-rods 9 and obtain a more simple and cheap construction. Furthermore, in this modification I employ two clutch-wheels 21 to provide room between for the dog-operating pulleys 91. Many other changes may be employed as convenience and conditions dictate, but further illustration thereof is deemed to be unnecessary. The features thus described are the features of especial novelty in the motor and transmitting means which I desire particularly to claim in the present case, and I do not deem it necessary to detail the construction of the coöperating parts, such as the motor or engine proper and the means therein for governing the movements of the same. All these parts and others connected with the vehicle may be such as are commonly employed. Peculiar adaptations of the same may be made by me, especially in the motor, to be described in other applications.

In operating the device, power being applied to the motor by means of expansive air or gas, steam, combustible gas, or other power-producing media, the pistons in the motor-cylinders are driven and transmit power to the oscillating shaft in any suitable manner. The oscillating movement of said shaft is transmitted to the rocking arm $h$, which in turn transmits its movements to the connecting-rod $j$ and sector $u$, the movements of this sector being increased or diminished by adjusting the pin $i$ with relation to the center of movement of the oscillating shaft. From the sector $u$ in the construction first described power is transmitted by means of the belt or strap 3, looped over the loose pulley 6, and from said strap, the looped parts of which are caused to move in opposite directions, the power is transmitted to the connecting-rods 9, which are thus given alternating reciprocations. Said connecting-rods in turn alternately operate the dogs 26 26 to produce the forward continuous movement of the clutch-wheel 21, which continuous movement is transmitted to the power-shaft 16 and from thence to the sprocket-wheel 23 and chain or connections 25 and sprocket-wheel 251, applied to the axle of the vehicle. By operating the hand-wheel $o$ and connections to bring the pin $i$ in line with the shaft $e$ the vehicle may be made to stand at rest, the motor continuing to operate. By operating the hand-lever $o$ the speed of the carriage is increased or diminished, and by operating the hand shifting-levers 41 and connections the direction of movement of the carriage is reversed, or the said carriage is caused to stand still while the motor continues in operation.

Having thus described the invention, what I claim as new is—

1. In a motor-driven vehicle, the means for regulating speed of said vehicle comprising an oscillating power-shaft and means for operating the same, a slideway arranged in connection with said shaft, a slide arranged in said slideway and having a pin $i$, a sector and means for connecting said sector to said pin and for transmitting power from said sector to effect a movement of the vehicle, and a flexible connection for effecting a movement of the slide in the slideway and differentiating the movement of the vehicle, substantially as set forth.

2. In a motor-driven vehicle, means for differentiating or changing the speed of said vehicle, comprising an oscillating shaft and motive means for operating the same, a slideway in connection with said shaft, a slide and connections for transmitting power therefrom to the wheels of the vehicle, and a belt or chain connected to said slide and changing its position in said slideway to vary the movements of the power-transmitting means, substantially as set forth.

3. In a motor-driven vehicle, means for changing the speed of said vehicle, comprising an oscillating shaft and motive means for operating the same, a slideway oscillating in connection with said shaft, a slide arranged on said slideway, a belt or chain connecting with said slide at or near its opposite ends, means for operating said belt or chain and effecting a change in the location of said slide and means for transmitting power connected to said slide, the movement of said transmitting means being increased or diminished by the change in location of the slide substantially as set forth.

4. In a motor-driven vehicle, means for changing the speed of said vehicle comprising an oscillating shaft and means for operating the same, a slideway attached to said shaft, a slide, a chain attached at different points to said slide, a sprocket-wheel and hand-shaft operating said chain, and means attached to said slide for transmitting reciprocating movement therefrom, substantially as set forth.

5. In a motor-driven vehicle, the combination with the oscillating shaft $e$, of a slideway attached to said shaft at one end thereof, and disposed at right angles to the axial line of said shaft, a slide having connections $k, k$, near opposite ends of said slide and an intermediate connection $i$, at one side of said slide and idle pulleys or wheels $p, p$, disposed near the axial center line of said shaft $e$, a flexible connection the ends of which are attached to said connections $k$, and are arranged over said pulleys the said flexible connection being adapted to draw the slide back and forth in the slideway when moved in one direction or the other, means for operating said flexible connection, and means for transmitting power from said intermediate connection $i$, substantially as set forth.

6. In a motor-driven vehicle, the combination with the oscillating shaft $e$, of a slideway attached to said shaft and having sprocket wheels or pulleys $p, p$, a slide having connections at opposite ends and intermediate connections for power-transmitting means, and a chain arranged on said sprocket-wheels and in connection with said end connections, substantially as set forth.

7. In a motor-driven vehicle, the combination with the oscillating shaft $e$, and means for operating the same, of a slideway attached to said shaft and having sprocket-wheels journaled thereon, a slide having the opposite connections $k, k$, chain $l$, hand-shaft and sprocket-wheel thereon and connecting-rod $j$, pivoted on said slide means for transmitting power from said connecting-rod $j$, substantially as set forth.

8. In combination with the oscillating shaft $e$, adjustable slide attached thereto, a sector in connection with said slide and oscillated thereby, a clutch-wheel, clutch-dogs connected to and alternately operated by said sector to effect a forward movement of the clutch-wheel and a power-shaft carrying said clutch-wheel and means for transmitting power from said power-shaft to effect a movement of the vehicle, substantially as set forth.

9. In combination with the oscillating shaft $e$, adjustable slide attached thereto, a sector, connecting-rod $j$, strap 3, having oppositely-moving parts 8, 8, connecting-rods 9, attached to said oppositely-moving parts and carrying clutch-dogs, a clutch-wheel, power-shaft and connections, all arranged and adapted to operate substantially as set forth.

10. In a motor-driven vehicle, the combination with the oscillating shaft $e$, and means for operating the same, a slide and connecting-rod pivoted on said slide, means for adjusting the slide in its slideway, a sector, dogs and means for transmitting oscillating movements alternately to said dogs from said sector, a clutch-wheel continuously driven by alternate impulses from said dogs and means for transmitting power from said clutch-wheel, substantially as set forth.

11. In a motor-driven vehicle, the combination with a reciprocating rod, flanged wheel, and its shaft, of a clutch-dog eccentrically pivoted upon said rod and centrally pivoted upon the arm of a sleeve 22, and having toothed bosses 28, 28, adapted to lie on opposite sides of the flange of said wheel, said sleeve 22, having an arm upon which the said dog is pivoted, and means for reciprocating said rod, substantially as set forth.

12. In a motor-driven vehicle, the combination with a reciprocating rod, a flanged wheel and its shaft and means for reciprocating said rod, of a clutch-dog having bosses adapted to engage the opposite sides of said flange, said dog being eccentrically pivoted upon said rod and centrally pivoted upon a sleeve arranged upon said shaft and said sleeve, and means arranged on said shaft for changing the movement of said dog upon its central pivot, whereby it will effect a reverse result in its clutching operations, substantially as set forth.

13. In a vehicle, the combination with a flanged clutch-wheel, and a clutch-dog having bosses to engage the opposite sides of the wheel-flange, of a flexible strap and means for imparting a reciprocating movement thereto, substantially as set forth.

14. In a motor-driven vehicle, the combination with the flanged clutch-wheel, of a pair of pivotal clutch-dogs and means for alternately operating the same, the said pivotal clutch-dogs being each provided with a pair of clutch-bosses to engage the opposite sides of the wheel-flange and a tooth or finger 262, a sliding rack and means for operating the same, a wheel-like stop having pinion 31, and notched flanges, all arranged and combined, substantially as set forth.

15. In a clutch device having a pivotal dog, the combination with said dog, of a wheel-like stop having notched flanges, the notches being disposed out of opposite coincidence whereby the dog-tooth is free to enter only one of said notches at a time, substantially as set forth.

16. In a vehicle, the combination with a flanged clutch-wheel, and a pivotal clutch-dog having bosses to engage the opposite sides of the wheel-flange, a strap for imparting reciprocal movement to said clutch-dog and oscillating the same on its pivot, and means for reciprocally operating said strap, substantially as set forth.

17. In a vehicle, the combination with a power-shaft 16, and a flanged clutch-wheel arranged thereon, of a loose sleeve arranged on said shaft and having a slideway for a rack and having an arm or extension providing a pivotal bearing for a clutch-dog, said clutch-dog having bosses to clutch the flange of the clutch-wheel, a pivotal stop having a pinion to engage the rack, and having notched flanges, a rack arranged in said slideway and meshing with said pinion, and rack-shifting means, all arranged and adapted to operate substantially as set forth.

18. In a motor-driven vehicle, the combination with reciprocating and alternating means for operating a pair of clutch-dogs, of said clutch-dogs and a flanged wheel, the clutch-dogs being each pivoted to the alternating and reciprocating operating means and pivoted upon a sleeve of a power-shaft, said power-shaft, sleeve, a rack, a flanged and notched pinion and shifting means, all arranged and operating, substantially as set forth.

19. In a motor-driven vehicle, having a floor or body resting on springs, the latter being supported by the axle, the axle and body thus having independent movements, a rocking or oscillating frame carried by the body of the vehicle and carrying the vehicle-driving devices at one end, means for transmitting power from said driving devices to the axle and a counterbalancing-spring 17, for holding the power-transmitting means in operative relation, said parts being combined, substantially as set forth.

20. In a motor-driven vehicle, having a floor or body resting on springs and said springs resting upon an axle, the combination with said body, springs and axle of a rocking or oscillating frame carried by the body and in turn carrying the power-shaft and means for operating the same, and a spring for counterbalancing the weight of said shaft and operating means, substantially as set forth.

21. In a motor-driven vehicle, the combination with the body, springs $a'$, and axle, of a rocking frame and axle-driving means thereon, a stay 161, and power-transmitting connection 25, and a counterbalance-spring 17, all arranged and operating, substantially as set forth.

22. In a vehicle, the combination with speed-regulating devices, a flexible connection for operating the same, and a hand-shaft, of a brake for the vehicle and means arranged on said flexible connection for operating the said brake, substantially as set forth.

23. In a vehicle, the combination with the speed-regulating devices, a flexible connection for operating the same to effect a variation of speed, a brake for retarding the progress of the vehicle and means operated by said flexible connection and operating the brake to retard movement when operating the regulating devices to prevent a transmission of motive force, substantially as set forth.

24. In a vehicle, the combination with the oscillating shaft $e$, and means for operating the same, a slide having a chain attached at or near its opposite ends, means for directing the chain or holding it near the center of oscillation of the shaft, a hand-shaft and its sprocket-wheel for operating said chain and changing the location of the slide, a connection $j$, and means for receiving reciprocating movement and converting the same into continuous movement and applying the latter kind of movement to the axle, and means arranged on said chain contiguous to a brake for stopping or retarding the progress of the vehicle, said means being disposed to engage the brake when the chain is in position to bring the end of the connection $j$, into alinement with the axial line of the reciprocating shaft, all substantially as and for the purposes set forth.

25. In a motor-driven vehicle, the combination with the shaft $e$, slideway $g$, having pulleys $p$, $p$, slide $h$, connection $j$, for transmitting power from said slide, of a chain attached to the opposite ends of said slide and arranged on said pulleys and having swivel-joints $s$, therein and means for operating said chain, substantially as set forth.

In testimony that I claim the foregoing I have hereunto set my hand this 6th day of January, 1899.

JOHN C. BLEVNEY.

Witnesses:
CHARLES H. PELL,
RUSSELL M. EVERETT.